(12) United States Patent
Conner et al.

(10) Patent No.: US 6,314,448 B1
(45) Date of Patent: Nov. 6, 2001

(54) METHOD AND SYSTEM FOR INTER-APPLET COMMUNICATION IN A COMPUTER NETWORK

(75) Inventors: Michael Haden Conner, Austin; Bryce Allen Curtis, Round Rock; Jimmy Ming-Der Hsu, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/090,838

(22) Filed: Jun. 4, 1998

(51) Int. Cl.[7] .................. G06F 15/16; G06F 15/177
(52) U.S. Cl. .................. 709/202; 709/249; 370/401
(58) Field of Search .................. 709/202, 219, 709/243, 249, 201; 707/4; 370/401, 408

(56) References Cited

U.S. PATENT DOCUMENTS

| | | | |
|---|---|---|---|
| 5,944,781 | * 8/1999 | Murray | 709/202 |
| 5,951,636 | * 9/1999 | Zerber | 709/202 |
| 5,987,454 | * 11/1999 | Hobbs | 707/4 |
| 5,992,752 | * 11/1999 | Wilz, Sr. et al. | 235/472 |
| 6,131,116 | * 10/2000 | Riggins et al. | 709/219 |

OTHER PUBLICATIONS

Sharon Machlis, Screening for applets, Computerworld, pp. 51–52, Feb. 1997.*

Edwards & Rees, High security Web servers and gateways, Computer Networks, 927–938, 1997.*

Distributed Info–Bus. Oct. 3, 1997. Bryce Curtis, Jim Hsu.

* cited by examiner

Primary Examiner—Mark H. Rinehart
Assistant Examiner—Farzaneh Farahi
(74) Attorney, Agent, or Firm—Richard A. Henkler; Bracewell & Patterson, L.L.P.

(57) ABSTRACT

A method and system are disclosed in a computer network for efficiently permitting code applets to communicate with other code applets remotely located within the computer network, wherein the computer network includes local network sites linked to remote network sites. Initially a communications link is established at each local network site, wherein the communications link permits code applets to communicate with one another. The communications link is composed of an InfoBus for inter-applet communication. The communications links are then interconnected, such that during a subsequent processing of the code applet at a local network site, the code applet may communicate with a code applet maintained at a remote network site, thereby forming a distributed communications link throughout the computer network. Gateways are also established at each local and remote network site within the communications network, wherein the gateways permit code applets maintained at local network sites to communicate with code applets maintained at other network sites. Each gateway established at each local network site is linked with each communications link installed at each local network site.

18 Claims, 6 Drawing Sheets

An InfoBus with Producer and Consumer

Fig. 7

METHOD AND SYSTEM FOR INTER-APPLET COMMUNICATION IN A COMPUTER NETWORK

BACKGROUND OF THE INVENTION

1. Technical Field

The present invention relates to improved information-retrieval methods and systems. In particular, the present invention relates to improved information-retrieval methods and systems which utilize so-called "applets, " or small pieces of code that can be transported over computer networks. More particularly, the present invention relates to an improved method and system in a computer network for permitting applets to communicate within one another.

2. Description of the Related Art

The development of computerized information resources, such as remote networks, allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a Graphical User Interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. Each web page can also be referred to simply as a "page."

Key to the development of such web pages has been the use of object-oriented programming languages. Object oriented-programming is a method for structuring programs as hierarchically organized classes describing the data and operations of objects that interact with other objects. One such object-oriented programming language that is currently utilized in the programming arts a great deal is "Java," developed by Sun Microsystems, Inc. Java™ is also a trademark of Sun Microsystems, Inc. ("Sun"). Java™ is similar to the C++ programming language well known in the programming arts. Java™, however, is a smaller and more portable programming language than that of the C++ programming language. Programmers typically find Java™ easier to use than the C++ programming language because Java™ can manage memory on its own. Because programs written in Java™ are typically compiled into byte-codes, which are similar to machine code and not dedicated to any specific platform, Java™ can run on any platform, which makes the Java™ programming language useful for programming World Wide Web applications.

Java™, and other similar Internet programming languages, typically utilize applets to transfer data. Applets are essentially small pieces of code that can be transported over the Internet and executed on the recipient's machine. The term is especially used to refer to programs as they are embedded in line as objects in HTML documents on the World Wide Web. Presently, applets do not communicate with one another, except via inter-applet communication models such as the so-called "InfoBus" (referred to herein simply as "InfoBus" and described in greater detail herein) which allows applets to communicate with one another, but only on a single machine (e.g., a client) as explained herein. It would be desirable to allow applets to communicate with one another throughout an entire computer network, such as the Internet. By permitting applets to communicate with one another over an entire computer network, vast amounts of data can be more efficiently transferred and processed, thus decreasing download time and promoting increased "user-friendly" Internet software. Based on the foregoing, it can be appreciated that a need exists for a method and system which would promote distributed inter-applet communication over a computer network.

SUMMARY OF THE INVENTION

It is therefore an object of the invention to provide an improved information-retrieval method and system.

It is another object of the invention to provide an improved information-retrieval method and system that utilizes so-called "applets," or small pieces of code that can be transported over computer networks.

It is still another object of the invention to provide an improved information-retrieval method and system that permits applets to communicate with one another over a computer network.

The above and other objects are achieved as is now described. A method and system are disclosed in a computer network for efficiently permitting code applets to communicate with other code applets remotely located within the computer network, wherein the computer network includes local network sites linked to remote network sites. Initially a communications link is established at each local network site, wherein the communications link permits code applets to communicate with one another. The communications link is composed of an Infobus for inter-applet communication. The communications links are then interconnected, such that during a subsequent processing of the code applet at a local network site, the code applet may communicate with a code applet maintained at a remote network site, thereby forming a distributed communications link throughout the computer network. Gateways are also established at each local and remote network site within the communications network, wherein the gateways permit code applets maintained at local network sites to communicate with code applets maintained at other network sites. Each gateway established at each local network site is linked with each communications link installed at each local network site.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
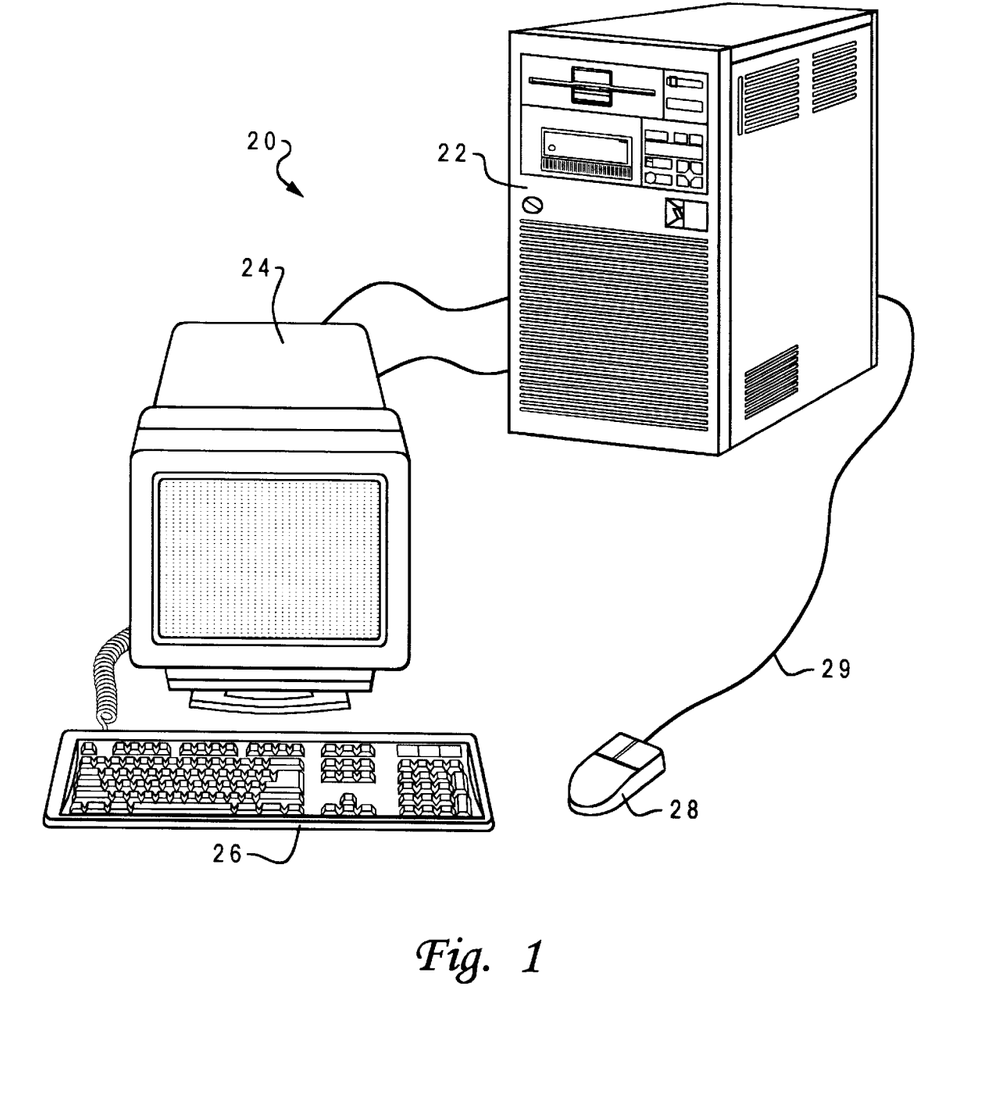
FIG. 1 is a pictorial representation of a data-processing system which may be utilized to implement the method and system of the present invention.

With reference now to the figures and in particular with reference to FIG. 1, there is depicted a pictorial representation of a computer system which may be utilized in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations or mini-computers. Computer system 20 includes a Graphical User Interface (GUI) that resides within a machine-readable media to direct the operation of computer system 20. Those skilled so in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24. Mouse 28 is one type of common pointing device that may be utilized in accordance with a preferred embodiment of the present invention. A cable 29 connects mouse 28 to computer system 20.

Figure 2:
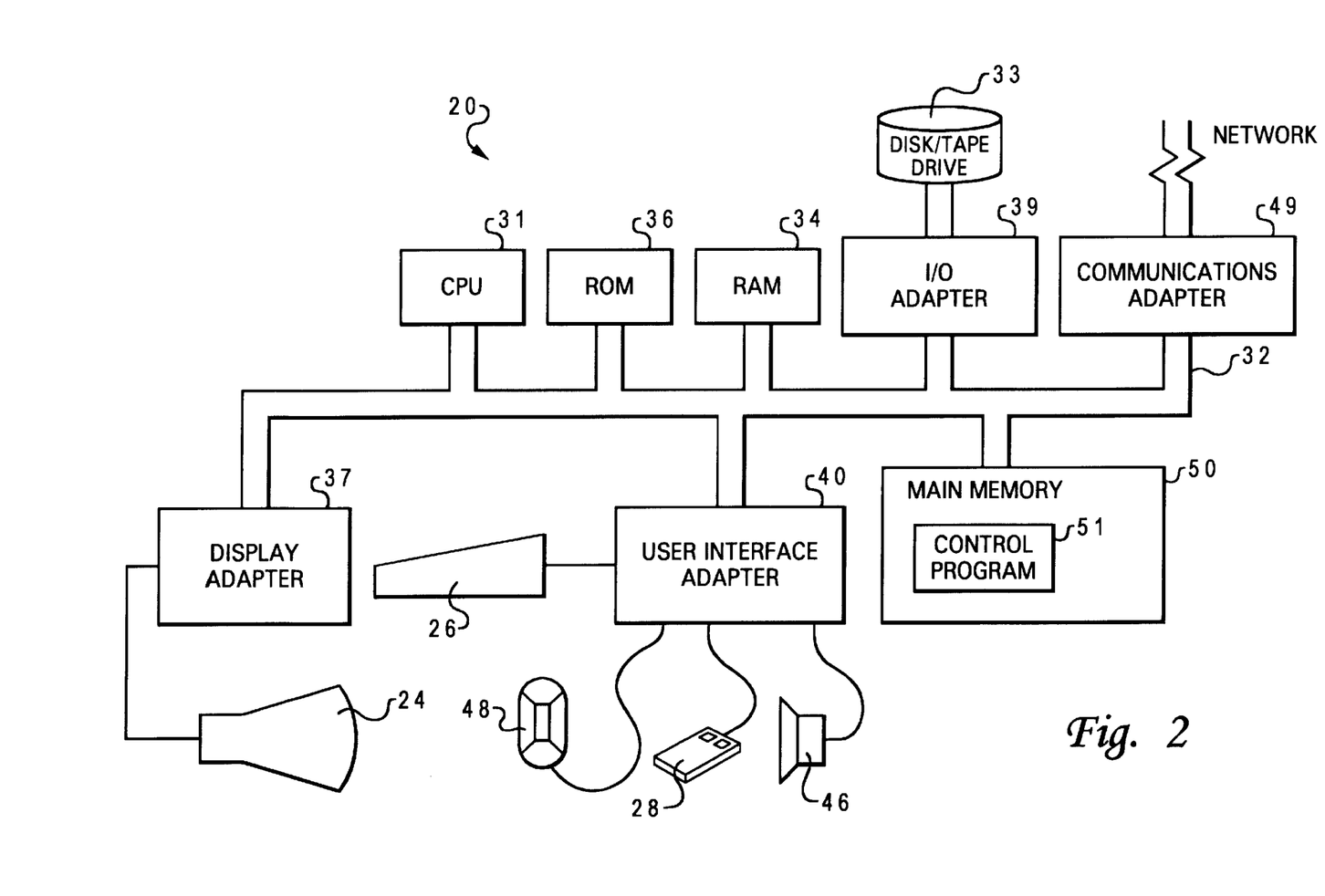
FIG. 2 depicts a representative hardware environment of a computer system which may be utilized in accordance with a preferred embodiment of the present invention.

FIG. 2 depicts a representative hardware environment of a computer system which may be utilized in accordance with a preferred embodiment of the present invention. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or microfloppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid crystal display. Those skilled in the art can thus appreciate that computer system 20 may be implemented as a notebook-based computer. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a GUI that resides within a machine-readable media to direct the operation of computer system 20. Any suitable machine-readable media may retain the GUI, such as RAM 34, ROM 36, a magnetic diskette, magnetic tape, or optical disk (the last three being located in disk and tape drives 33). Any suitable operating system and associated GUI (e.g., Microsoft Windows) may direct CPU 31. For example, the AIX operating system and AIX windows windowing system (i.e., GUI) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
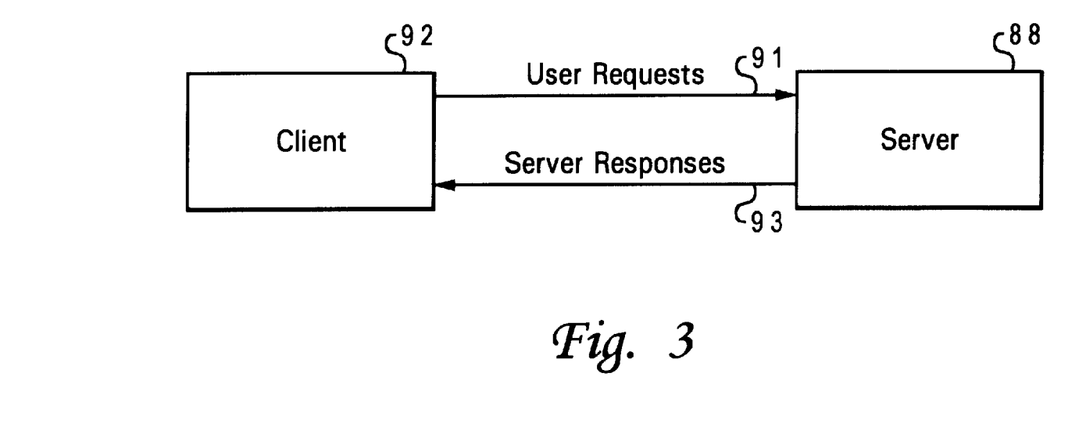
FIG. 3 illustrates a block diagram illustrative of a client/server architecture which may be utilized to implement the method and system of the present invention.
Figure 4:
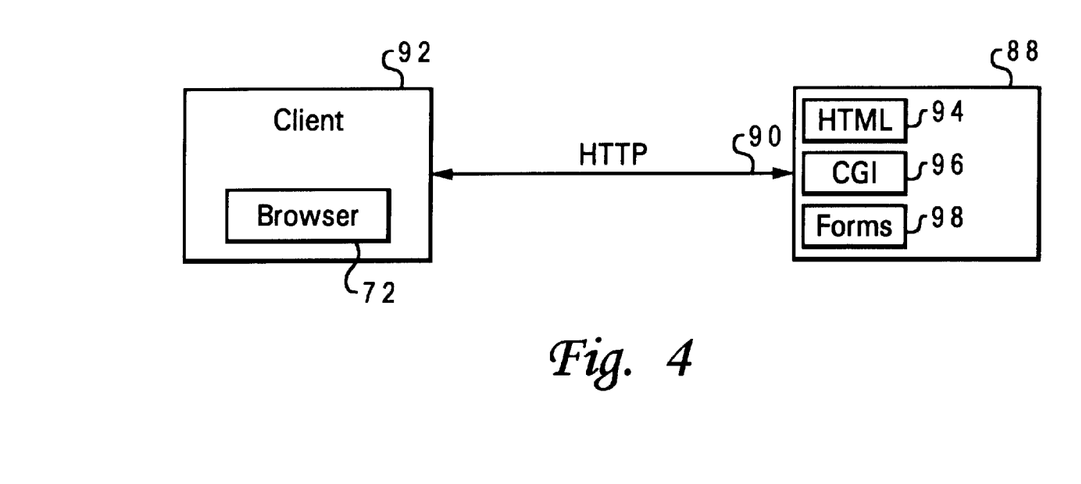
FIG. 4 depicts a detailed block diagram illustrative of a client/server architecture which may be utilized to implement the method and system of the present invention.
Figure 5:
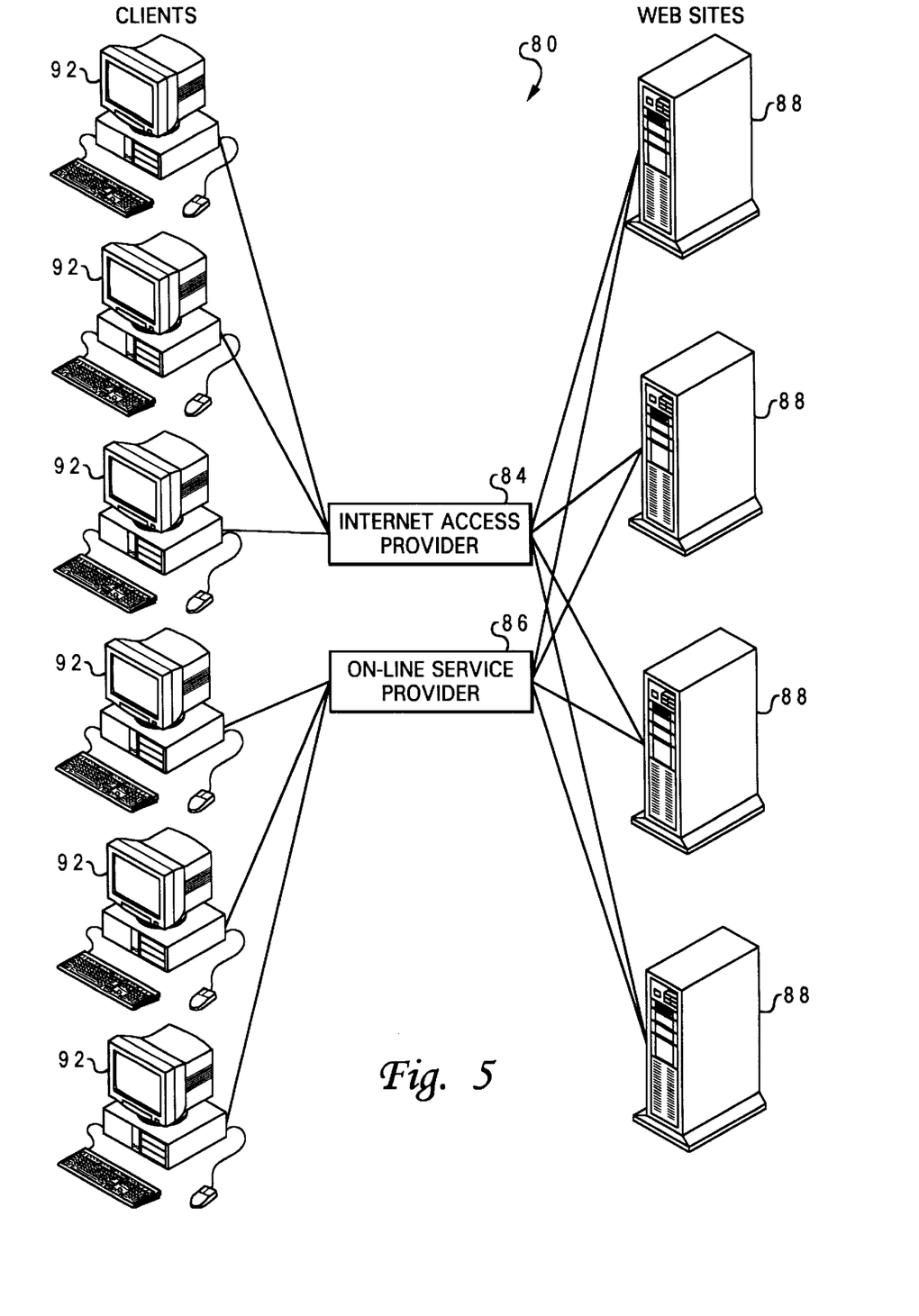
FIG. 5 is a diagram illustrative of a computer network which may be implemented in accordance with the method and system of the present invention.

In FIG. 3, FIG. 4, and FIG. 5, like parts are indicated by like numbers. FIG. 3 illustrates a block diagram illustrative of a client/server architecture which may be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which may be utilized in accordance with the method and system of the present invention. Although the client and server are processes which may be operative within two or more computer systems, such processes being generated from a high-level programming language (e.g., PERL) which is interpreted and executed in a computer system at run-time (e.g., a workstation), it can be appreciated by one skilled in the art that such processes may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 5 is a diagram illustrative of a computer network 80 which may be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Central to a discussion of a preferred embodiment of the present invention is the idea of an InfoBus model for inter-applet communication. InfoBus has been adopted as an industry standard for inter-applet communication, and can be incorporated for use with Internet routines such as the "Java™ Development Kit," which is well known in the art of Internet communications. InfoBus enhances existing Sun JavaBean™ component architecture ("JavaBean" is a trademark of Sun Microsystems, Inc.). JavaBeans™ are reusable code components that can be blended together to form an applet. However, one of the drawbacks of JavaBeans™ is that there is no standardized way to dynamically exchange data.

While an application designer can easily design an application that utilizes a custom protocol for intercommunication, those code components may not function elsewhere, because a different protocol may be expected. While the ideas of "bean" introspection and reflection help in these regards, this may not be enough to allow an individual to take code that was written by different programmers and combine such codes in a simple and straightforward manner. By providing a "standard," InfoBus makes it much easier to take code components from a myriad of origins and allow such code to work cooperatively.

Infobus interfaces allow application designers to create data flows between cooperating JavaBeans™. Such "beans" or components can be classified according to three types: data producers, data consumers, and data controllers. An individual component can act as both a data producer and data consumer. Between components, data flows in names objects referred to as data items. Data controllers are specialized components that mediate the rendezvous between producers and consumers. Data exchange between producers and consumers follow four steps:

1. Membership—Any Java™ component can connect to the InfoBus. Connection is accomplished by implementing an InfoBusMember, containing an InfoBus instance, and having the member join it.

2. Listening for InfoBus events—InfoBus members receive bus notification by implementing the producer and consumer interfaces and registering such producer and consumer interfaces with the InfoBus.

3. Rendezvous on the data to be exchanged—Data producers announce the availability of new data, and consumers solicit data from producers as they require that data. This rendezvous is accomplished by using a data item name, which is represented by a String.

4. Retrieval of the data item—A data can be retrieved as a String or a Java™ object. Strings are desired because they require little specialized understanding of data formats on the part of the data consumer. Java™ objects are typically used as object wrappers for primitive types.

Figure 6:
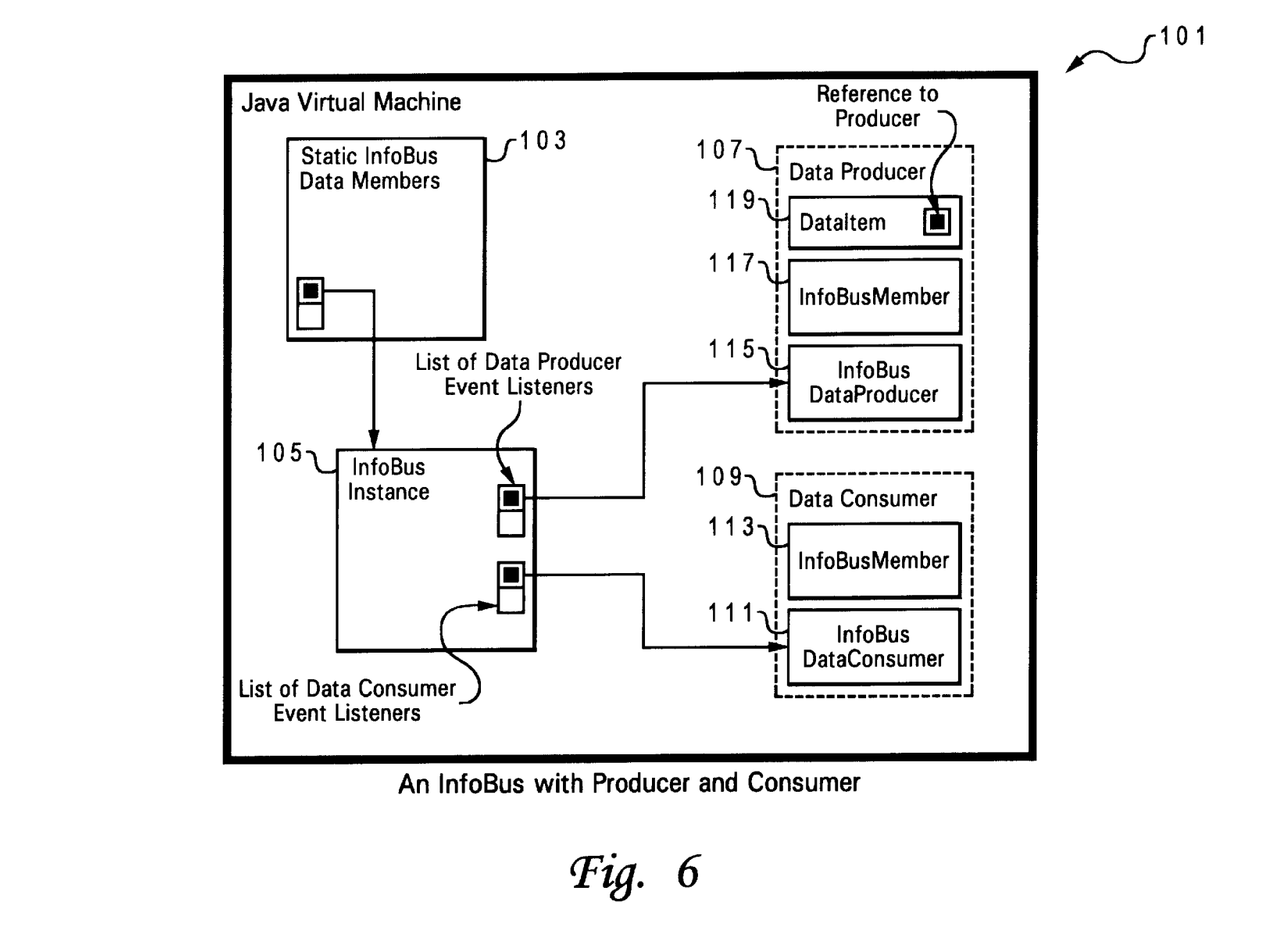
FIG. 6 depicts a block diagram illustrative of an InfoBus with producer and consumer components, in accordance with a preferred embodiment of the present invention.

The InfoBus is composed of five basic classes and interfaces: the InfoBus class, the InfoBusMember, InfoBusDataProducer, InfoBusConsumer, and DataItem interfaces. Any useful InfoBus application will have all five of these classes and interfaces implemented, as depicted in FIG. 6. FIG. 6 depicts a block diagram illustrative an InfoBus 101 with producer and consumer components, in accordance with a preferred embodiment of the present invention. Thus, as illustrated, FIG. 6 depicts a block diagram illustrative an InfoBus 101 with producer and consumer components, in accordance with a preferred embodiment of the present invention. As illustrated in FIG. 6, static InfoBus data members 103 send data to InfoBus instance 105.

A list of data producer event listeners is included within InfoBus instance 105 which is sent to InfoBusDataProducer 115, which forms a portion of Data Producer 107. Data Producer 107 is also composed of an InfoBusMember 117 and a DataItem 119, which references the producer. A list of data consumer event listeners is also included within Infobus instance 105 which send data to InfoBusDataConsumer 111. InfoBusDataConsumer 111 forms a portion of data consumer 109. InfoBusMember 113 also forms a portion of data consumer 109.

The InfoBus class lies at the heart of the InfoBus technology. As such, the InfoBus is central to the rendezvous and event model. Methods are provided by InfoBus to obtain a reference to or open an InfoBus instance, join an InfoBus, and leave an InfoBus. Methods are also provided for announcing, revoking and finding data items by name. Some of the methods are indicated as follows:

InfoBus open(Component component)
   Obtain a reference to an existing or new InfoBus.
void join(InfoBusMember member)
   Join an InfoBus. Usually called during applet start method.
void leave(InfoBusMember member)
   Leave an InfoBus. Usually called during applet stop method.
void addDataProducer(InfoBusDataProducer producer)
   Register as data producer.
void removeDataProducer(InfoBus Data Producer producer)
   Remove data producer.
void addDataConsumer(InfoBusDataConsumer consumer)
   Register as data consumer.
void removeDataConsumer(InfoBusDataConsumer consumer)
void fireItemAvailable(String dataItemname, InfoBusDataProducer producer)
   Announce Availability of data item.
void fireItemRevoked(String dataItemname, InfoBusDataProducer consumer)
   Revoke data item.
ObjectfindDataItem(String dataItemName, InfoBusDataConsumer consumer)
   Find a data item.
Object[ ] findMultipleDataItems(String dataItemlName, InfoBusDataConsumer consumer)
   Find multiple data items.

The InfoBus Member interface must be implemented by classes that desire to join an InfoBus. Such an interface defines methods for joining and leaving an InfoBus, and also managing the InfoBus. Such methods are described below:

void setInfoBus(InfoBus infobus)
   This method is called by InfoBus.join( ) to set the member data reference, and to reset when leaving the InfoBus.
InfoBus getInfoBus( )
   This method returns the current InfoBus instance.
void addInfoBusListener(VeotableChangeListener vcl)
void removeInfoBusListener(VeotableChangeListener vcl)
   These methods allow other members to veto a change to an InfoBus property.
void addInfoBusListener(PropertyChangeListener pcl)
void removeInfoBusListener(PropertyChangeListener pcl)
   These methods allow other members to be notified when an InfoBus property is about to be changed.

A data producer, such as data producer 107 of FIG. 6, announces data availability or revocation, and "listens" for requests by implementing InfoBusDataProducer 115. To begin receiving events, the producer calls addDataProducer. Applets typically accomplish this via their start( ) method and being to receive events when the "page" is activated, and subsequently call removeDataProducer in the stop( ) method. This reduces the overhead when the page is not active.

InfoBus.fireItemAvailable is called by a producer to announce the availability of a data item. If a consumer is interested in that particular item, then the consumer calls InfoBus.findDataItem, which calls the producer's dataItemRequest method, during which the producer checks to determine if that producer is in fact the producer of the requested data item. If so, a pointer to the data item is returned.

A data consumer, such as data consumer 109 of FIG. 6, "listens" for availability and revocation events, and makes requests for data items by implementing the InfoBusDataConsulner interface (e.g., InfoBusDataConsumer 111 of FIG. 6). The consumer (e.g., data consumer 109) receives information about any new data by handling dataItemAvailable and its revocation via dataItemRevoked. The consumer determines whether it is interested in the data by inspecting the data item name obtained from the event via getDataItemName. If the consumer wants the data, the consumer can retrieve the data directly from the producer by calling requestDataItem. The consumer can also blindly request data items that have not been announced. This may be required if the consumer joins the InfoBus after the producer announces availability.

A data item, such as data item 119 of FIG. 6, is composed of any Java™ object that is passed by reference from a producer to a consumer. The name of the data item is available via getDataItenName, and it's producer can be found utilizing getsource. Ideally, the data item is a standard proxy for accessing existing data, rather than a container of data. To provide consistent formats so that producers and consumers can exchange data, the data item can implement one of the following interfaces: ImmediateAccess, Array Access, RowsetAccess, and DbAccess. A data item implements the Immediate Access interface to allow data values to be retrieved directly from calls to methods on this interface. An immediate rendering of the data as a String or Object is obtained using getValueAsString and getValueAsobject. Conversely, the data item can be changed by a consumer via setValue.

The Array Access interface provides a prescription for creating and accessing an n-dimensional array. Its dimensions can be obtained via getDimension, and individual elements can be accessed using getItemByCoordinates, wherein each element is a data item. The remaining interfaces are utilized to access data that is organized into tables containing rows and columns. This is typical in relational database systems wherein each row contains the same number of columns. Since databases are usually quite large, cursers are utilized to access one row at a time. This is reflective of the underlying database server program which controls all access to the data. In addition to reading a row, provision is also made to modify the data utilizing insert, update, or delete operations.

Thus, from the foregoing, it can be appreciated that InfoBus is an example of a specialized type of communications link. However, communication links, such as InfoBus™, are currently designed to function only with applets running on a Java™ Virtual Machine, or single computer. Because the Java™ Virtual machine runs on a single computer, InfoBus™ alone does not allow applets to communicate over a computer network, such as the Internet. However, according to a preferred embodiment of the present invention, as described herein, by distributing the InfoBus™ over the computer network, applets may communicate with other applets over the computer network as they did in within the original Java™ Virtual Machine, or single computer. The effect of such a design is to provide a standardized method and system of computer network applet communication, while simplifying the model for programming client-server applications.

Figure 7:
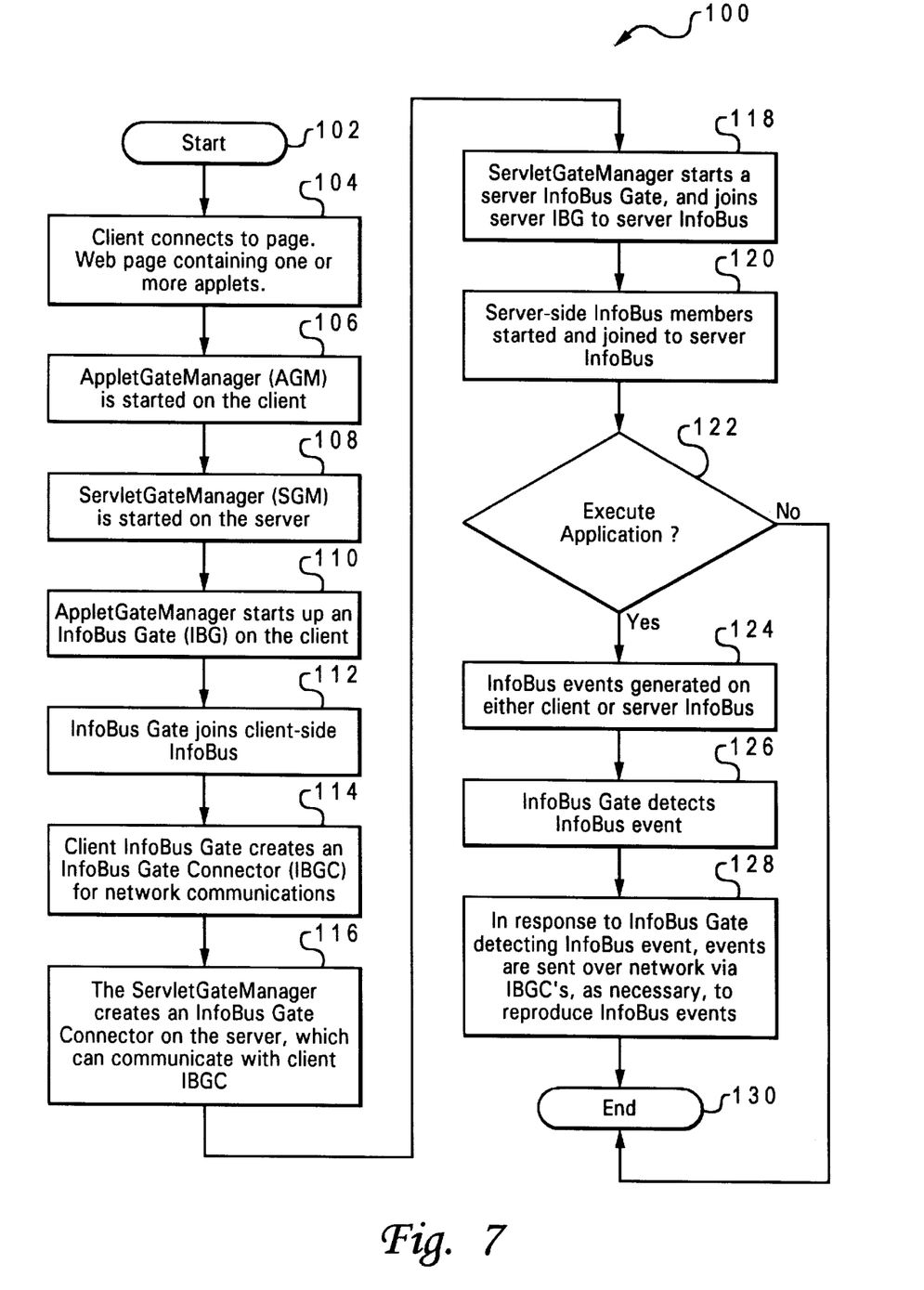
FIG. 7 depicts a flowchart of operations illustrating a method for the management of Graphical User Interface objects, in accordance with a preferred embodiment of the present invention.

FIG. 7 depicts a flowchart of operations 100 illustrating a method for implementing a distributed Infobus, in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1 and FIG. 2, in processing electrical or other (e.g. mechanical, chemical) physical signals to generate other desired physical signals.

Thus, as depicted at block 102, the process is initiated. As illustrated at block 104, the client connects to a web page containing one or more applets. When the client connects the web page, an additional applet, referred to as an AppletGateManager(AGM) is automatically started on the client, as illustrated at block 106. Thereafter, as described at block 108, a partner servlet, referred to as a ServletGateManager(SGM) is automatically started on the server. The AppletGateManager starts up an InfoBus Gate (IBG) on the client, as indicated at block 110. The AppletGateManager then joins the client-side InfoBus, as depicted at block 112. As subsequently described at block 114, the client IBG then creates an InfoBus Gate Connector (IBGC) for network communications.

The ServerGateManager also creates an IBGC on the server, which can communicate with the client IBGC, as indicated at block 116. The SGM also starts a server IBG, and joins it to a server InfoBus, as illustrated at block 118. The server-side InfoBus members may be started and joined to the server InfoBus, as indicated at block 120. As depicted thereafter at block 122, a test is performed to determine whether or not to execute an InfoBus application, which results in the communication of one or more applets with one another.

If a decision is made to execute the application, the process continues, as indicated at block 124. However, if the application is not executed, then the process simply terminates, as indicated at block 130. Thus, as illustrated at block 124, during execution of the application, InfoBus events are generated on either the client or server InfoBus. As described at block 126, these events are detected by an IBG. Thereafter, as indicated at block 128, in response to the IBG detecting InfoBus events, the events are sent over the computer network via IBGCS, as necessary, to reproduce InfoBus events, in effect producing a distributed InfoBus throughout the computer network. The process then finally terminates, as indicated at block 130.

The steps described in blocks 102 to 130 can be summarized as follows: a communications link composed of an InfoBus is installed at each local computer network site, wherein a first code applet (i.e. first applet) may communicate with a second code applet (i.e., second applet) at each local computer network site; the communications links are then interconnected, such that during a subsequent processing of the first code applet at a local computer network site, the first code applet may communicate with a second code applet maintained at another computer network site, thereby forming a distributed communications link throughout the computer network. In essence according to the operations depicted in FIG. 7, gateway proxies are utilized to listen in on local InfoBus activity and reproduce remote InfoBus events and data changes throughout the computer network.

So long as InfoBus events on the remote (e.g., server) InfoBus are reproduced exactly on the local (e.g., client) infoBus, communications between InfoBus members will function in the same manner, regardless of the individual location of the InfoBus members within the computer network. This situation creates a local/remote transparency abstraction. In order to maintain this transparency abstraction, all InfoBus broadcast events, such as "data available," "data requests," and "data revokes" are reproduced over the computer network by the distributed InfoBus described herein.

The distributed InfoBus immediately caches any data as soon as it is announced. The data is also sent over the computer network to the remote InfoBus, where this data is also cached. The reason caching is performed in this manner is that normally a request for data would be delayed while waiting for a network transmission and response. This is known as "two-way latency." If the data is cached, it can return immediately, preventing this unnecessary delay, which in turn improves the performance of the system.

The distributed InfoBus can also be provided with built-in support for customizing distributed InfoBus settings during runtime, thus providing maximum flexibility for application designers. One setting is referred to as "IBGateForwardStatus," which controls the level of message passing that can be accomplished by the distributed InfoBus described herein. The level of message passing is controlled by a value having a string which can be set as follows:

ALL—Pass all events

NONE—Pass no events

LIST—Pass only events in "IBGateNamesToPass"

This setting is intended to optimize situations where some of the data items are local-only and need not be forwarded. This feature can be utilized by a user to filter messages. In addition, "IBGateForwardStatus" also features several other settings, which are defined as follows:

PASSALL—Pass all events

DENYALL—Pass no events

PASSLIST—Pass only events in IBGateNamesToPass

DENYLIST—Pass all events except those in "IBGateNamesToPass"

Another setting is referred to as "IBGateNamesToPass," which determines which data items are forwarded if "IBGateForwardStatus" is set to "LIST." This setting includes a "SimpleDataItem" whose value is composed of a string that is tokenized by commas. If "IBGateNameToPass" contains a string matching the name of a data item, the string is allowed to pass over the computer network. So-called "wild cards" may also be utilized at the end of strings to specify sets of data item names.

An additional setting is referred to as "IBGatePollingTimes," which determines the interval of time that the distributed InfoBus waits between HTTP polling. "IBGatePollingTimes" includes a value that includes a string, also tokenized by commas. For example, if "IBGatePollingTimes" is set to "400," "800," and "1200," and there no client-side activity occurs, the client will attempt to poll as 400 ms, 800 ms, and then every 1200 ms thereafter.

According to a preferred embodiment of the present invention, InfoBus switching may occur during a particular session. The distributed InfoBus includes build-in support for switching InfoBuses during runtime. This ability to switch InfoBuses is accomplished by setting "IBGateServerInfoBusname" to "null," which prompts the user for a new InfoBus name. "IBGateServerInfoBusName" is then set to an empty string that causes the distributed InfoBus to generate a new private InfoBus, which is accomplished by generating a random name to be used for the new InfoBus. Although uniqueness is not guaranteed, it is highly unlikely that the same random name will ever be used by another client. Setting "IBGateServerInfoBusName" to any other string causes the distributed InfoBus to switch to another InfoBus, using the same string.

An analogy can be made between Java™ program objects and electronic equipment in that both can intercommunicate. Just as a remote control device communicates with a television set, for example, a program object communicates with other program objects (e.g., by calling a method or subroutine). Standards exist for such communication. In electronic communication, for example, a standard for audio and video signals allows the connection of televisions, stereos, and video cassette recorders despite different manufacturers. Similarly, for programming, standards exist for object intercommunication. One such standard is the InfoBus, as described herein. Using the InfoBus standards, one program object can communicate with other program objects via the InfoBus, even if these objects were written by different programmers.

On a browser page containing multiple Java™ applets, sharing of information is traditionally a difficult task, due to the formation of a barrier around the applet, much like the walls of a room. Comparing this to the "electronic equipment analogy," such a barrier is comparable to barriers present in attempting to connect electronic equipment in different rooms. For example, a browser page might contain a data source, such as a spreadsheet applet, along with a graph of that data, such as a bar chart applet. Because such objects are contained in different applets, they did not possess an efficient method for sharing data.

One of the benefits of the InfoBus, as described herein, is that objects can communicate with other objects within the same Java Virtual Machine (JVM), which breaks through the "walls" maintained between applets. Thus, a spreadsheet applet could announce a row of data, and a bar chart inside a different applet can receive and graph that data. Because InfoBus is implemented as a standard communications link, other InfoBus objects found elsewhere may share in the data.

However, as explained previously, because the InfoBus functions properly only within a single Java Virtual Machine, the InfoBus itself remains limited in applications. Continuing the "electronic equipment" analogy described earlier, the limitations of the InfoBus are analogous to boundaries between buildings. Although the InfoBus does allow objects to communicate between "rooms" in the same "building," a method and system does not exist which would allow the InfoBus to connect to objects outside of a Java Virtual Machine, which is a severe limitation for a great deal of the programs that designers and programmers would like to write.

The "distributed" InfoBus described herein overcomes these limitations by utilizing a computer network to connect InfoBuses located on different Java Virtual Machines. For instance, by using a computer network such as the Internet, objects are able to communicate within one another over vast distances, thus creating a powerful communications link between applets. The true value of the distributed InfoBus, however, lies in the amount of time and effort that is saved when one attempts to harness a distributed InfoBus application. Because of the simplicity and transparency of the distributed InfoBus, programmers are free to concentrate on the design of their business logic, rather than dealing with the details of the computer network at hand. As long as a designed application is written to communicate utilizing the distributed InfoBus, and hence the InfoBus standard, very little extra overhead is required to permit the designed application to function over a particular computer network, such as the Internet, which is a tremendous improvement and advance over the method in which applications were previously created.

For example, if an individual previously wrote a network "chat" program without a distributed InfoBus, as described herein, a considerable amount of time would be spent designing and debugging the network aspect of the designed application. This would require a significant amount of network knowledge to obtain correct responsiveness performance.

With a distributed InfoBus, however, a designer simply adds a desired applet, specifies particular network settings as parameters, and writes an application using the InfoBus standard. All the details of the network, such as setting up connections, use of network protocols, and performance improvement are "hidden" from the designer. In addition the network details required to allow clients to connect to different chat rooms, and receive proper updates, are all handled by the distributed InfoBus, which ultimately frees the designer to concentrate his or her time and resources in designing the business logic, such as improving the chat program's interface.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method in a computer network for efficiently permitting code applets to communicate with other code applets remotely located within said computer network, wherein said computer network includes local network sites linked to remote network sites, said method comprising the steps of:

installing at each local network site within said computer network, a communications link that permits code applets to communicate with one another; and interconnecting said communications links within said computer network by establishing gateways at each local and remote network site within said communications network wherein messages at any gateway are reproduced at all gateways within a said communications network, such that during a subsequent processing of a code applet at a local network site, said code applet may communicate with a code applet maintained at a remote network site, thereby forming a distributed communications link throughout said computer network.

2. The method of claim 1 further comprising the steps of:
    processing a code applet at said local network site; and
    generating a communications event, in response to processing said code applet at said local network site, such that said communications event may be generated at either the local network site or remote network site.

3. The method of claim 2 further comprising the steps of:
    transferring said code applet from a remote network site to a local network site, in response to connecting said local network site to said remote network site; and
    storing said code applet within a memory cache, in response to transferring said code applet from said remote network site to said local network site.

4. The method of claim 3 further comprising the steps of:
    prompting a user to customize a particular gateway, in response to transferring said code applet from said, remote network site to said local network site; and
    customizing said particular gateway, in response to user input.

5. The method of claim 4 further comprising the step of switching to a communications link installed at another network site.

6. A system in a computer network for efficiently permitting code applets to communicate with other code applets remotely located within said computer network, wherein said computer network includes local network sites linked to remote network sites, said system comprising:

means for installing at each local network site within said computer network, a communications link that permits code applets to communicate with one another; and means for interconnecting said communications links within said computer network, by establishing gateways at each local and remote network site within said communications network wherein messages at any gateway are reproduced at all gateways within said communications network, such that during a subsequent processing of a code applet at a local network site, said code applets may communicate with a code applet maintained at a remote network site, thereby forming a distributed communications link throughout said computer network.

7. The system of claim 6 further comprising:
    means for processing a code applet at said local network site; and
    means for generating a communications event, in response to processing said code applet at said local network site, such that said communications event may be generated at either the local network site or remote network site.

8. The system of claim 7 further comprising:
    means for transferring said code applet from a remote network site to a local network site, in response to connecting said local network site to said remote network site; and
    means for storing said code applet within a memory cache, in response to transferring said code applet from said remote network site to said local network site.

9. The system of claim 8 further comprising:
    means for prompting a user to customize a particular gateway, in response to transferring said code applet from said remote network site to said local network site; and
    means for customizing said particular gateway, in response to user input.

10. The system of claim 9 further comprising:
    means for switching to a communications link installed at another network site.

11. A program product residing in computer memory within a computer in a computer network for efficiently permitting code applets to communicate with other code applets remotely located within said computer network, wherein said computer network includes local network sites linked to remote network sites, said program product comprising:

instruction means residing in a computer for installing at each local network site within said computer network, a communications link that permits code applets to communicate with one another; and instruction means residing in a computer for interconnecting said communications links within said computer network by establishing gateways at each local and remote network site within said communications network wherein messages at any gateway are reproduced at all gateways within said communications network, such that during a subsequent processing of a code applet at a local network site, said code applet may communicate with a code applet maintained at a remote network site, thereby forming a distributed communications link throughout said computer network.

12. The program product of claim 11 further comprising:

instruction means residing in a computer for processing a code applet at said local network site; and instruction means residing in a computer for generating a communications event, in response to processing said code applet at said local network site, such that said communications event may be generated at either the local network site or remote network site.

13. The program product of claim 12 further comprising:

instruction means residing in a computer for transferring said code applet from a remote network site to a local network site, in response to connecting said local network site to said remote network site; and instruction means residing in a computer for storing said code applet within a memory cache, in response to transferring said code applet from said remote network site to said local network site.

14. The program product of claim 13 further comprising:

instruction means residing in a computer for prompting a user to customize a particular gateway, in response to transferring said code applet from said remote network site to said local network site; and instruction means residing in a computer for customizing said particular gateway, in response to user input.

15. The program product of claim 14 further comprising:

instruction means residing in a computer for switching to a communications link installed at another network site.

16. The program product of claim 15 wherein each of said instruction means further comprises signal bearing media.

17. The program product of claim 16 wherein said signal bearing media further comprises transmission media.

18. The program product of claim 16 wherein said signal bearing media further comprises recordable media.

* * * * *